Sept. 27, 1949.  H. R. FRY, JR  2,482,969
AMPOULE SEALING AND DISCHARGING DEVICE
Filed Nov. 23, 1943  4 Sheets-Sheet 4

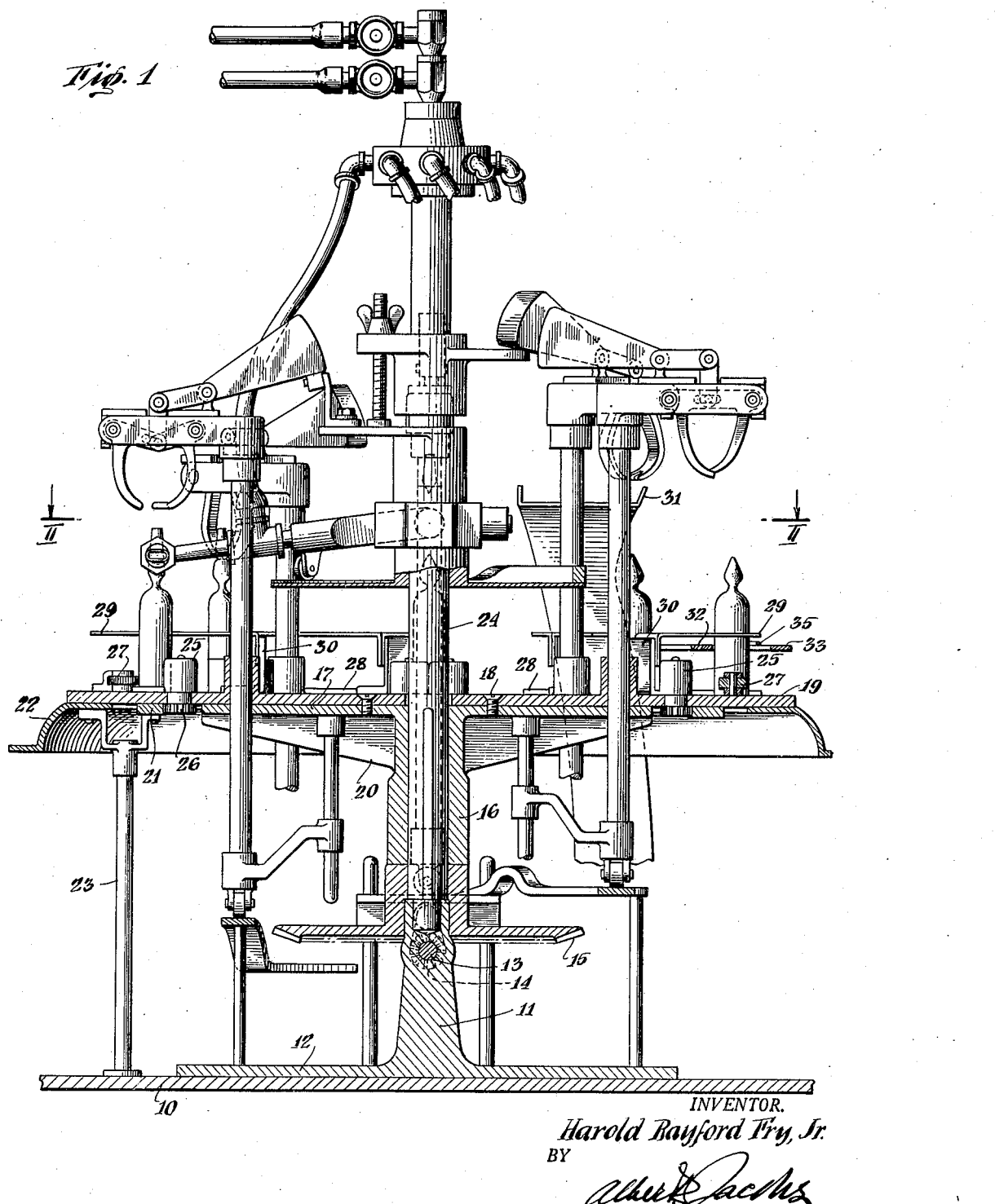

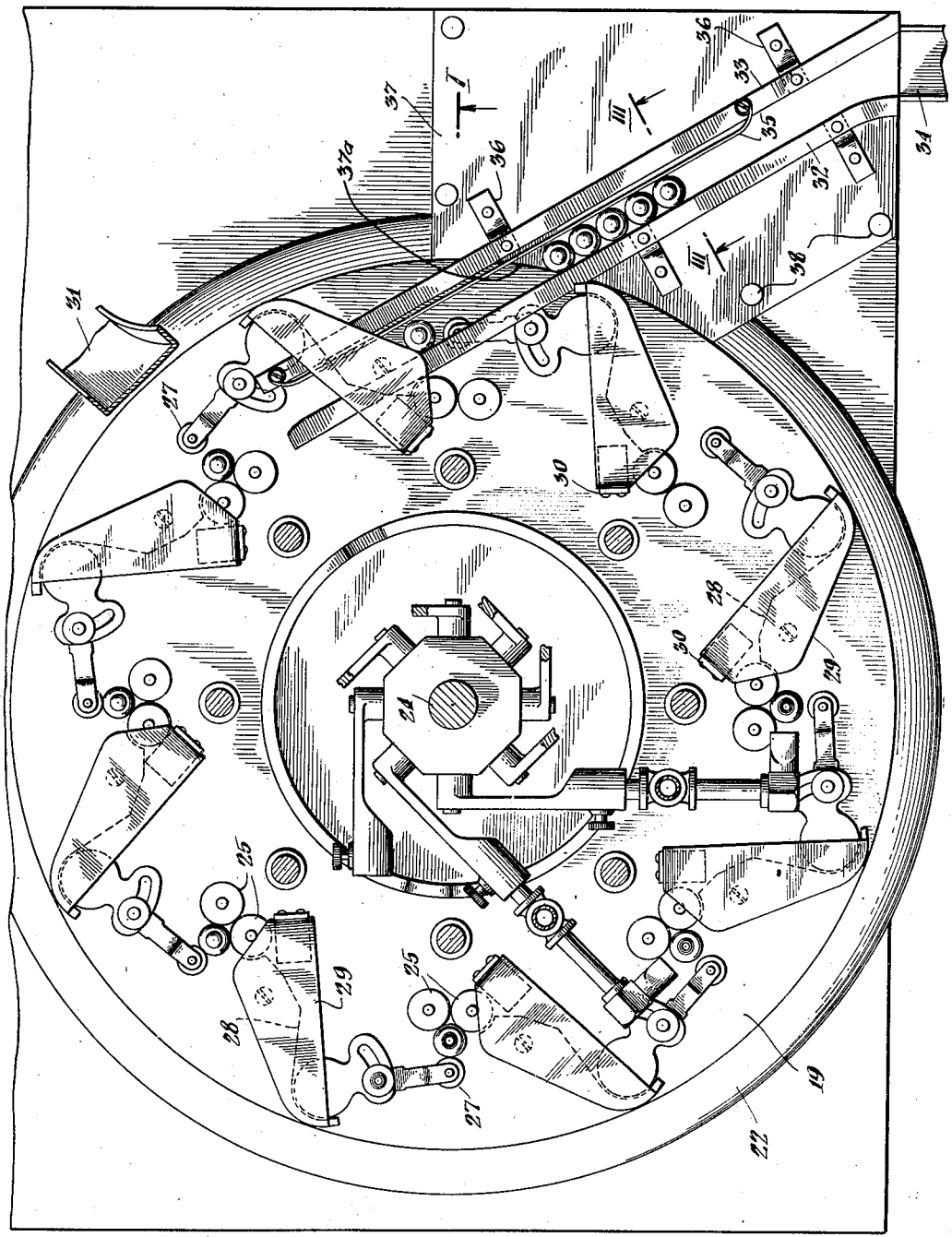

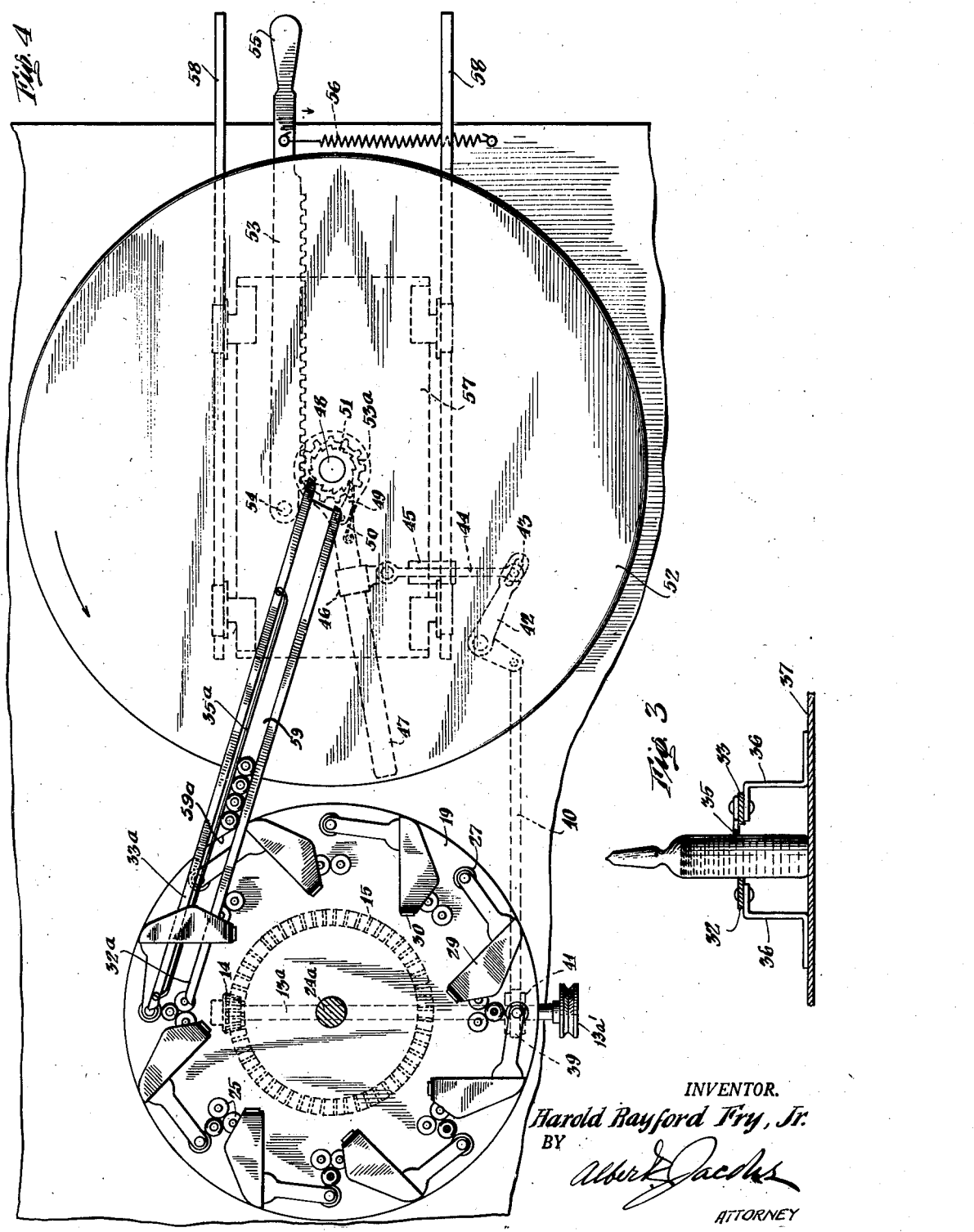

Inventor
HAROLD RAYFORD FRY, JR.

Attorney

Patented Sept. 27, 1949

2,482,969

UNITED STATES PATENT OFFICE 2,482,969

AMPOULE SEALING AND DISCHARGING DEVICE

Harold Rayford Fry, Jr., Troy, N. Y., assignor, by mesne assignments, to Winthrop-Stearns Inc., New York, N. Y., a corporation of Delaware Application November 23, 1943, Serial No. 511,389

15 Claims. (Cl. 49—7)

The present invention relates to improvements in ampule sealing machines and more particularly to a device for collecting and discharging ampules just subsequent to the sealing of such ampules.

Machines for sealing ampules, for removing those portions of the ampules above the sealed areas and for dropping the finished ampules through apertures in the machine into a chute which conveys them to a suitable receptacle are well known and have been in use for some time. While they differ in details, they are essentially constructed in accordance with Cozzoli Patent 2,258,408 granted October 7, 1941, reference to which is made for the detailed description and operation thereof and the pertinent portions of which are hereby made a part hereof. In such a machine a turntable is provided which has a number of stations at each of which an ampule is adapted to be received and held. Each such ampule rests upon a retractible plate or plunger underlying an aperture in the turntable. Filled ampules are manually fed successively to the stations of the machine and as the turntable makes one rotation each ampule is subjected to heat fusion while undergoing rotation. After each ampule is thus heated the portion above the sealed area is removed by grippers and the removed portions dropped into a separate chute, the heated ampule portion then becoming sealed. The still hot ampules are allowed to drop through apertures in the turntable by the automatic retraction of the plate or depression of the plunger on which each such ampule rests or removed from the turntable in some equivalent fashion.

While these machines are generally satisfactory, it is well known that they result in the production of many damaged or broken ampules. One of the primary reasons for this is the fact that when the hot ampules are dropped through the turntable into the chute, the liquid contents of the ampule come in contact with the still hot heat sealed area and cause many ampules to fracture or crack or otherwise become damaged to an extent that they must subsequently be discarded. In many cases valuable liquid medicinals constitute the contents of the ampule and breakage or fracture of the ampules results in the loss of the medicinals. As a corollary, the cost per perfect finished ampule is necessarily somewhat higher than it should be and for extensive operations involving the production of many thousands of sealed ampules such losses become economically significant. Due to the nature of the ampule discharging mechanism, the whole operation has to be slowed down, thus resulting in decreased production. These and other defects and disadvantages have made it desirable to improve the machine but this has not heretofore been satisfactorily accomplished insofar as I am aware.

It is, accordingly, one of the objects of the present invention to provide a special collecting and discharging device for ampule sealing machines which minimizes or eliminates defective or damaged ampules and which, therefore, conserves valuable medicinals and reduces the cost of a finished perfect ampule.

Another object of the invention is to modify a standard or conventional ampule sealing machine in such manner as to provide a longer period of cooling between the time when the ampule is sealed and the time when it is discharged into a receptacle or container, thus avoiding that damage which is due to the contact of the liquid medicinal on the hot glass of the just sealed ampule.

A further object of the invention is to increase the production of sealed ampules in a given period of time and in this connection my present invention results in at least a 50–60% greater production of perfect ampules for each nine (9) hours of operation.

Other and further objects and advantages will be understood by those skilled in the art or will be apparent or pointed out hereinafter.

In the accompanying drawings:

Fig. 1 illustrates a machine embodying my invention, this view being partly in vertical elevation and partly in vertical section and taken along the line I—I of Fig. 2;

Fig. 2 is a horizontal section through the machine of Fig. 1 taken along the line II—II thereof;

Fig. 3 is a detail sectional view, partly in elevation, through the collecting and discharge portion of the machine taken along the line III—III of Fig. 2; and Fig. 4 is a plan view of a modified form of the invention.

Like numerals designate corresponding parts throughout the various views of the drawings.

Figure 5:
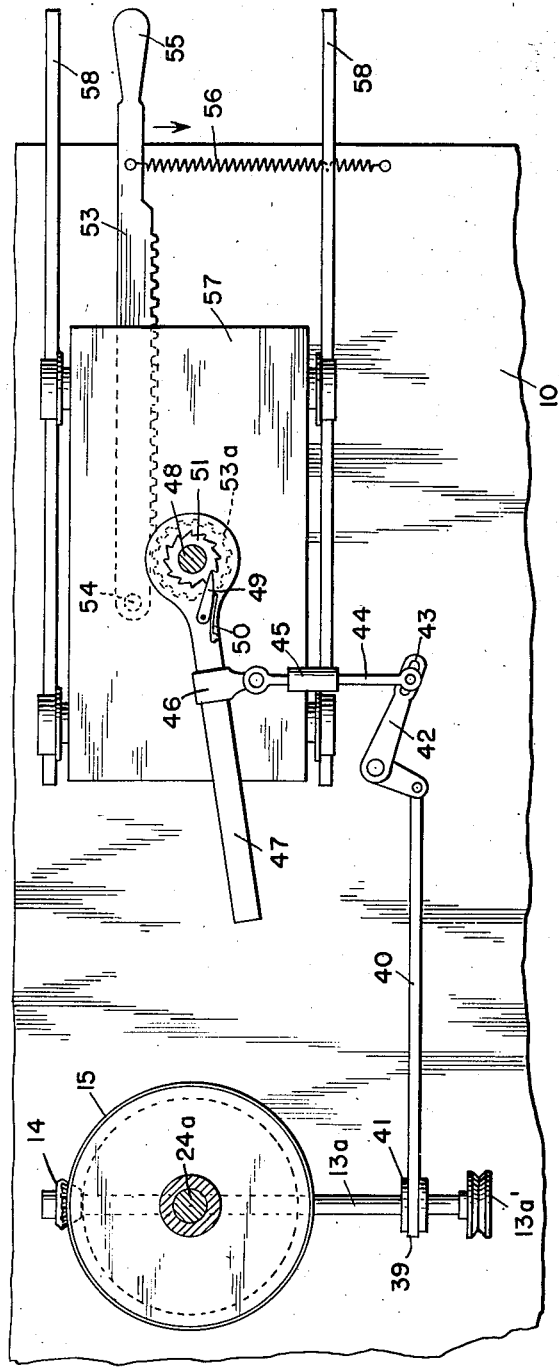
Fig. 5 is also a plan view of the modified form of the invention of Fig. 4 but illustrating only that part of the mechanism appearing below the member 52 and the drive therefor.
Figure 6:
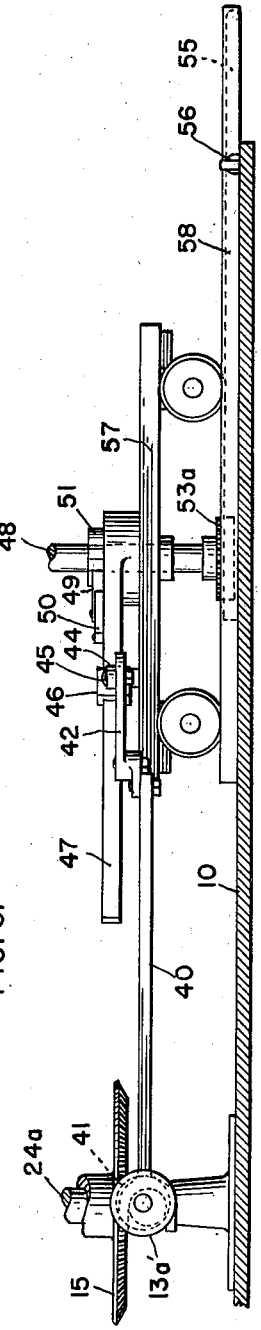
Fig. 6 is an elevation of the elements shown in Fig. 5.

Referring first to Figs. 1, 2 and 3, it will be observed that the ampule sealing portion of the machine is substantially in accordance with Cozzoli Patent 2,258,408 to which reference has been made above. This ampule sealing portion per se forms no part of the present invention and may, subject to certain qualifications to be set forth hereinafter, be of conventional or known character. This portion of the machine includes a suitable base 10 from which the standard 11 rises preferably centrally thereof, such standard having a flange portion 12 suitably secured to the said base. In standard 11 a horizontal or transverse drive shaft 13 is suitably provided. A pinion 14 on shaft 13 meshes with and actuates bevel gear 15, the latter being operatively connected to the depending tubular housing 16, the upper end of which is provided with a large circular flange 17 secured, as by screws 18, to the under surface of turntable 19. Suitable strengthening braces or ribs 20 may be provided, as shown, for the usual purpose. Below the turntable 19 is provided a ring gear 21 disposed somewhat inwardly from the periphery of the turntable. A suitable annular depending flange or collar 22 is likewise provided as shown for protective and covering purposes, the lower outer rim of which rests upon the top of a suitable enclosing cabinet (not shown) for the lower parts of the machine. A series of supporting columns 23 (like that shown in Fig. 1) extends between base 10 and the said collar 22 and gear 21, the top of each column being provided with a yoke-shaped bracket as shown which supports the said collar and gear. An axial shaft 24 rises through housing 16, extending through a central aperture in turntable 19 and carrying burners, grippers and air and gas connections at various levels, all as shown in the drawings and in the said Cozzoli patent.

A plurality of pairs of vertically disposed rolls 25 are provided (eight pairs being illustrated by way of example only). Each roll of each such pair of rolls has a portion extending through an aperture provided in the turntable for such purpose and terminating in a pinion 26 which is constantly in mesh with ring gear 21. It will be appreciated that an ampule is positioned in the bight of each such pair of rolls and that suitable gentle pressure is exerted laterally against each such ampule by means of the adjustable idle roll mechanism indicated by the numeral 27 and the details of which per se form no part of the present invention. As the rolls are rotated by rotation of the turntable the ampules between such rolls are also rotated. The purpose is to ensure even heating of the ampule for sealing the same in the subsequent heating and fusing operation. The burners and grippers are so constructed and mounted as to carry out the heat fusion of the ampules and to remove the ampule pieces above the sealed area. The details of construction and operation thereof are well-known and per se form no part of the present invention. Reference is made to the Cozzoli patent for a description thereof. Turntable 19 is free from the prior ampule apertures with their underlying retractible plates or depressible plungers and in this respect differs from and is much simpler than prior constructions.

Adjacent each pair of rolls 25 is a set of cam plates, each set comprising a lower cam plate 28 mounted on the turntable 19 and an upper cam plate 29 vertically spaced above the lower cam plate and connected to the turntable by means of a suitable angle bracket 30. Each cam plate has an active cam edge surface configured to contact an ampule after travelling through a path of about 360° or less. The lower cam plates contact ampules near their bottom and the upper cam plates contact ampules about midway of the height thereof, therefore making it possible to propel the ampules laterally at the desired time with little or no tendency to overturn the ampule. As may be seen from Fig. 2, the contours of the ampule engaging edges of the cam plates 28 and 29 are identical, and plate 29 is secured in position so that its ampule engaging edge is directly above and coincides with a vertical projection of the ampule engaging edge of the lower cam plate 28. It is to be understood that ampules of different sizes and shapes may be employed and that corresponding changes may be made in the cam plates. Thus it will be appreciated that an ampule is successively placed in the bight of each pair of rolls 25 at the time when such pair of rolls has passed clockwise beyond the discharge point, and that while each such ampule may be manually placed in the position shown in the drawing, a mechanical or automatic feed may be employed, if so desired, without departing from the scope or principle hereof. Each ampule is then subjected to the heat of a burner which automatically comes into operative position and uniform heating of the ampule neck is obtained by virtue of the fact that the ampule is rotating due to the rotation of the rolls 25. After the required heating is effected, each ampule passes into the sphere of operation of a pair of grippers. The heating operation has resulted in the fusion of a short vertical area of the ampule neck, and therefore when a pair of grippers is lowered and takes hold of the upper end of the ampule neck and thereafter rises, the upper portion of the ampule neck is readily drawn upwardly a sufficient distance to cause separation of it from the fused portion of the ampule neck which thereupon collapses upon itself to an extent sufficient to seal the contents of the ampule out of contact with the atmosphere. As the turntable continues to rotate slowly in a clockwise direction, the removed ampule portions are successively released by each pair of grippers and fall into a special discharge chute 31 from which they pass to a receptacle.

The sealed ampules travel with the turntable until they reach a position near the entrance end of the pathway provided between the guide members 32, 33, successive ampules being caused to enter between such guides and being propelled partway thereinto by means of the cam plates 28, 29 as will be clearly appreciated from Fig. 2. As successive ampules are propelled into the guideway, those ampules previously in the guideway are gradually forced in an outward direction until the front of the row of ampules reaches a point near the exit end of the guides, at which time they are relatively cool and are manually removed by an attendant who places them in a carton or suitable container or may drop onto chute 34 whence they travel by gravity to a container. To avoid undesirable movement of the ampules and to insure that they are maintained in an upright position, a wire-like spring member 35 is secured in the position shown in Fig. 2 to one of the guides so as to exert a light tension against the ampules, urging them against the opposite guide member and thus insuring the proper positioning of the ampules at all times while they are within the guides. Guides 32, 33 are secured as by brackets 36 to the horizontal shelf or plate 37 which is supported by suitable legs 38 which rest on the top of the enclosing cabinet (not shown) heretofore referred to. As may be observed from an examination of Figs. 1 and 2, the top of plate 37 is itself in the plane of the top of turntable 19, and the edge 37a of said plate is arcuately shaped to mate closely with the periphery of the turntable 19. By such mating, the ampules may move smoothly from the turntable onto the plate 37 between the guides 32, 33.

In the modified form of the invention illustrated in Fig. 4 the shaft 13a is provided with an eccentrically mounted pulley or wheel 41 to which the rod 40 is connected in any suitable manner as at 39. Rod 40 is connected to bell-crank lever 42, one end of which is slotted at 43 for the slidable reception of one end of the connecting rod 44 which passes through a stationary bearing or bushing 45 and is secured at its other end to a ring 46 slidably arranged on the post 47. One end of such post is pivoted freely around shaft 48 in such manner that rocking movements of the member 47 cause pawl 49, spring pressed at 50, to turn ratchet gear 51, thus turning supporting surface or member 52 counterclockwise to a proportional extent. Member 52 is mounted on an undercarriage 57 which travels from left to right along tracks 58, so impelled by the action of gear 53a upon toothed rack 53 which is pivotally mounted at 54 and the handle end 55 of which is constantly urged by spring 56 in a direction (see arrow) which maintains the rack teeth in mesh with gear 53a. Carriage 57 has wheels, as shown, which run upon the tracks 58.

Thus as shaft 13a is rotated, as by the application of power to the pulley 13a', the system of levers 40, 42, 44 causes rocking of member 47 thus notching member 52 around counterclockwise and at the same time gradually moving member 52 and carriage 57 from left to right (in Fig. 4), ring 46 sliding outwardly along post 47 and hence at the same time decreasing the angle through which member 47 rocks. The purpose and significance of this will be appreciated when it is realized that in this manner ampules are fed via guides 32a, 33a first at or near the center of member 52 and then spirally in ever widening manner toward the outer edge of member 52. As member 52 moves toward the right (in Fig. 4) the ends of guides 32a, 33a move toward the outer edge thereof thus withdrawing out of the way of the accumulating ampules on member 52. Guides 32a, 33a may be suitably fixedly mounted or supported at a point or points (not visible) between turntable 19 and member 52 and are provided with a bottom piece 59 which extends from the turntable 19 substantially to the ends of the guides over member 52 and which supports the ampules during their travel between the guides. It will be appreciated from a consideration of the foregoing and from an examination of Fig. 4 that the end of the bottom plate 59 abutting the turntable 19 is arcuately shaped to mate closely with the periphery of the turntable, and the top of the plate 59 between guides 32a and 33a where it fits against the edge of turntable 19, is flush with the latter; the ampules, therefore, move smoothly from the turntable onto the member 59 between the guides. Ampules may be taken from surface 52 as desired or required and this arrangement not only provides for the accumulation of a relatively large number of ampules but materially facilitates final inspection thereof and the picking out of defective ampules.

The foregoing is intended as illustrative and not as limitative and, within the scope and principles hereof, other and further additions, omissions, substitutions and modifications may be made. The invention is rather that defined by the appended claims.

What I claim is:

1. An ampule sealing and discharging device which comprises, in combination, means for sealing a succession of ampules one by one, means in receiving relation to the first means for collecting and cooling a substantial number of sealed ampules and for subsequently discharging the same and a transfer mechanism mounted on said first means for propelling each ampule, subsequent to the sealing thereof, from said first means to said second means.

2. An ampule sealing and discharging device of the character described, comprising means for receiving and holding a series of successive ampules in an upright position, means operatively associated with the receiving and holding means for subjecting each such ampule to fusion sealing while in the receiving and holding means, means for removing the portion of each such ampule superjacent the seal and means mounted on the receiving and holding means for propelling each such ampule still in upright position out of the sphere of influence of the foregoing means into a collecting, cooling and discharging portion adjacent said first means in which the just sealed ampules are retained and allowed to cool prior to removal therefrom.

3. An ampule sealing and discharging device as set forth in claim 1 in which said ampule sealing means is provider with a plurality of circumferentially spaced ampule receiving stations and means at each such station for rotating the ampule thereat, the transfer mechanism including means at each such station, operative when the ampules have travelled through a circular path of somewhat less than 360°, for propelling the ampules away from the sealing means and to the collecting, cooling and discharging means.

4. An ampule sealing and discharging device as set forth in claim 1 in which the ampule sealing means is provided with a turntable equipped for the reception of a series of successive ampules in circumferentially spaced relation, said turntable having a plurality of pairs of rolls for rotating the ampules and for maintaining them upright and said transfer mechanism including a pair of vertically spaced cam plates so constructed and arranged with relation to said rolls as to propel the ampules in an upright position, after they have travelled nearly 360°, from said ampule sealing portion to said ampule collecting, cooling and discharging means.

5. An ampule sealing and discharging device as set forth in claim 1 in which said ampule collecting, cooling and discharging means includes a horizontal shelf disposed adjacent said ampule sealing means, a pair of parallel spaced guides mounted on said shelf and arranged substantially tangentially to the path of said ampules and a tensioning spring disposed between said guide members.

6. In an ampule sealing and discharging device of the character described, a rotatable turntable, a plurality of stations on said turntable each of which is adapted to receive and hold an ampule in upright position, a pair of vertically spaced cam plates provided on said turntable at each such station, a horizontal shelf supported adjacent said turntable, a pair of parallel spaced guides mounted on said shelf and projecting at one end over a part of said turntable and arranged tangentially with respect to said turntable, the construction and arrangement being such that as said turntable substantially completes one revolution each pair of cam plates propels the adjacent ampule off said turntable into said guides, ampules successively entering said guides moving ampules previously in said guides a distance equal to the diameter of the entering ampule.

7. In a ampule sealing and discharging device of the character described, a collecting, cooling and discharging portion which comprises a horizontal shelf, a pair of parallel spaced guides mounted on said shelf and having an effective distance therebetween slightly greater than the diameter of the ampules to be received therein and tensioning means disposed between said guides and secured to one of them for exerting a light pressure on ampules received between the guides to maintain such ampules in an upright position without unduly restricting the ability of such ampules to move toward the discharge end of said guides.

8. An ampule sealing and discharging device as set forth in claim 1, the collecting, cooling and discharging means thereof including a disc of relatively large area as compared with the diameter of said ampules, means for turning said disc about its axis and means for bodily moving said disc linearly.

9. An ampule sealing and discharging device as set forth in claim 1 in which said ampule sealing means is provided with a plurality of circumferentially spaced ampule receiving stations and means at each such station for rotating the ampule thereat, the transfer mechanism including means at each such station, operative when the ampules have travelled through a circular path of somewhat less than 360°, for propelling the ampules away from the sealing means and to the collecting, cooling and discharging means, said collecting, cooling and discharging means including a disc of relatively large area as compared with the diameter of said ampules, means for turning said disc about its axis and means for bodily moving said disc linearly.

10. An ampule sealing and discharging device as set forth in claim 1 in which the ampule sealing means is provided with a turntable equipped for the reception of a series of successive ampules in circumferentially spaced relation, said turntable having a plurality of pairs of rolls for rotating the ampules and for maintaining them upright and said transfer mechanism including a pair of vertically spaced cam plates so constructed and arranged with relation to said rolls as to propel the ampules in an upright position, after they have travelled nearly 360°, from said ampule sealing portion to said ampule collecting, cooling and discharging portion, said collecting, cooling and discharging means including a disc of relatively large area as compared with the diameter of said ampules, means for turning said disc about its axis and means for bodily moving said disc linearly.

11. In a machine of the character described, a plurality of pairs of vertically spaced cam plates arranged in circumferentially spaced relation, each such pair of cam plates having active cam edge surfaces configured to make contact with an ampule near the bottom and about midway of the height thereof after travelling through a path of somewhat less than 360°, a rotatable turntable on which said cam plates are mounted in a generally radial position and a plurality of ampule receiving and holding stations on said turntable adjacent said cam plates, a surface of relatively large area adjacent said turntable, means for turning said surface in a horizontal plane and means for moving said surface simultaneously in a linear path away from said turntable.

12. In a machine of the character described, a plurality of pairs of vertically spaced cam plates arranged in circumferentially spaced relation, each such pair of cam plates having active cam edge surfaces configured to make contact with an ampule near the bottom and about midway of the height thereof after travelling through a path of somewhat less than 360°, a rotatable turntable on which said cam plates are mounted in a generally radial position and a plurality of ampule receiving and holding stations on said turntable adjacent said cam plates, a surface of relatively large area adjacent said turntable, means for turning said surface in a horizontal plane and means for moving said surface simultaneously in a linear path away from said turntable, the turntable and the surface being interconnected and synchronized in their movements.

13. In a machine of the character described, a plurality of pairs of vertically spaced cam plates arranged in circumferentially spaced relation, each such pair of cam plates having active cam edge surfaces configured to make contact with an ampule near the bottom and about midway of the height thereof after travelling through a path of somewhat less than 360°, a rotatable turntable on which said cam plates are mounted in a generally radial position and a plurality of ampule receiving and holding stations on said turntable adjacent said cam plates, a pair of parallel spaced guides being mounted adjacent said turntable and arranged substantially tangentially thereof, said cam plates propelling successive ampules into said guides where they are collected and cooled and from which they are ultimately discharged, a surface of relatively large area adjacent said turntable, means for turning said surface in a horizontal plane and means for moving said surface simultaneously in a linear path away from said turntable.

14. In a machine of the character described, a plurality of pairs of vertically spaced cam plates arranged in circumferentially spaced relation, each such pair of cam plates having active cam edge surfaces configured to make contact with an ampule near the bottom and about midway of the height thereof after travelling through a path of somewhat less than 360°, a rotatable turntable on which said cam plates are mounted in a generally radial position and a plurality of ampule receiving and holding stations on said turntable adjacent said cam plates, a pair of parallel spaced guides being mounted adjacent said turntable and arranged substantially tangentially thereof, said cam plates propelling successive ampules into said guides where they are collected and cooled and from which they are ultimately discharged, a surface of relatively large area adjacent said turntable, means for turning said surface in a horizontal plane and means for moving said surface simultaneously in a linear path away from said turntable, the turntable and the surface being interconnected and synchronized in their movements.

15. In a machine of the character described, a plurality of pairs of vertically spaced cam plates arranged in circumferentially spaced relation, each such pair of cam plates having active cam edge surfaces configured to make contact with an ampule near the bottom and about midway of the height thereof after travelling through a path of somewhat less than 360°, a rotatable turntable on which said cam plates are mounted in a generally radial position and a plurality of ampule receiving and holding stations on said turntable adjacent said cam plates, a pair of parallel spaced guides being mounted adjacent said turntable and arranged substantially tangentially thereof, said cam plates propelling successive ampules into said guides where they are collected and cooled and from which they are ultimately discharged, a surface of relatively large area adjacent said turntable, means for turning said surface in a horizontal plane and means for moving said surface simultaneously in a linear path away from said turntable, the turntable and the surface being interconnected and synchronized in their movements, said guides extending from said turntable to said surface.

HAROLD RAYFORD FRY, Jr.

REFERENCES CITED

The following references are of record in the file of this patent:

UNITED STATES PATENTS

| Number | Name | Date |
|---|---|---|
| 1,290,055 | Biggs | Jan. 7, 1919 |
| 1,455,037 | Belden | May 15, 1923 |
| 1,777,654 | Saviano | Oct. 7, 1930 |
| 1,981,641 | Benoit | Nov. 20, 1934 |
| 2,168,509 | Bennett | Aug. 8, 1939 |
| 2,258,408 | Cozzoli | Oct. 7, 1941 |